(12) United States Patent
West

(10) Patent No.: US 11,078,990 B2
(45) Date of Patent: Aug. 3, 2021

(54) PLANET LOCK

(71) Applicant: WEDGEROCK LLC, Limerick, ME (US)

(72) Inventor: Thomas C. West, Standish, ME (US)

(73) Assignee: WEDGEROCK LLC, Limerick, ME (US)

( * ) Notice: Subject to any disclaimer, the term of this patent is extended or adjusted under 35 U.S.C. 154(b) by 53 days.

(21) Appl. No.: 16/616,236

(22) PCT Filed: May 22, 2018

(86) PCT No.: PCT/US2018/033869
§ 371 (c)(1),
(2) Date: Nov. 22, 2019

(87) PCT Pub. No.: WO2018/217733
PCT Pub. Date: Nov. 29, 2018

(65) Prior Publication Data
US 2020/0124138 A1   Apr. 23, 2020

Related U.S. Application Data

(60) Provisional application No. 62/510,069, filed on May 23, 2017.

(51) Int. Cl.
  *F16H 1/36*    (2006.01)
  *F16H 1/28*    (2006.01)
  *F16K 31/53*   (2006.01)
  *F16K 35/00*   (2006.01)
  *B66D 5/00*    (2006.01)
  (Continued)

(52) U.S. Cl.
  CPC ............. *F16H 1/2863* (2013.01); *F16H 1/36* (2013.01); *F16K 31/53* (2013.01); *F16K 35/00* (2013.01); *B66D 5/00* (2013.01); *F16H 35/18* (2013.01); *F16H 2035/005* (2013.01)

(58) Field of Classification Search
  CPC ..... F16H 1/2863; F16H 1/36; F16H 2035/005
  See application file for complete search history.

(56) References Cited

U.S. PATENT DOCUMENTS

2014/0309071 A1* 10/2014 Croce ................... F16H 57/082
                                                          475/207
2015/0323042 A1* 11/2015 Jeon ......................... F16H 1/003
                                                          475/331
2016/0348760 A1* 12/2016 Wigsten ................ F16H 1/2863

* cited by examiner

*Primary Examiner* — Huan Le
(74) *Attorney, Agent, or Firm* — Caseiro Burke LLC; Chris A. Caseiro

(57) ABSTRACT

A self-locking apparatus for a gear set permits forward-driving an input in clockwise or counterclockwise directions and substantially prevents an output from being driven in either or both of those directions. The device includes a gear set with planet gears arranged within a planet carrier within a fixed ring gear. Each of the planet gears is engaged with the planet carrier via a differentiating connector retained in an elongated slot in the planet carrier where it moves to the clockwise position when being forward driven in the clockwise direction and, when the planet carrier is back driven in the clockwise direction, the connector moves to the counterclockwise position in the slot. This arrangement allows the gear set to be forward driven but not back driven. This differentiated action can engage/disengage with any form of unidirectional engage/disengage mechanism. The apparatus is useful in industrial applications requiring self-locking gear sets.

10 Claims, 7 Drawing Sheets

(51) Int. Cl.
*F16H 35/18* (2006.01)
*F16H 35/00* (2006.01)

PLANET LOCK

BACKGROUND OF THE INVENTION

1. Field of the Invention

The present invention relates to a self-locking mechanism for a gear set, and more particularly to an automatic locking device that substantially prevents a gear set from being back-driven while permitting the gear set to be forward driven.

2. Description of the Prior Art

The use of gear sets, (two or more gears meshed together) is well known for a variety of applications and in a wide range of devices. Typically, when two or more gears of any type (e.g. spur, planetary, worm) are meshed with one another, each gear in the chain is capable of driving the others in either rotational direction. (i.e. clockwise or counterclockwise direction) Depending upon the frictional forces inherent in the gear set, system forces acting on the resting gears may at times cause unwanted movement thereof (in either the clockwise or counterclockwise directions). For example, when positioning a butterfly valve in a fluid stream, the fluid's dynamic forces may become greater than the friction in the gear set, thus moving the butterfly valve out of position and causing it to back-drive the gear set. For many applications, such back driving is undesirable.

Referring now to FIG. 1, an example of the prior art is shown with respect to an apparatus 10 including a power source 20 (e.g. a manual hand wheel or electric motor) coupled to a gear set 30, which is further connected to, for example, a butterfly valve 40. The gear set 30 includes a sun gear 12, a plurality of planet gears 13 and a ring gear 17. Planet carrier 15 includes ports for retaining planet pins 14 fixed in position within the ports. As shown in FIG. 1, the butterfly valve 40 may be positioned by actuation of the power source 20 (e.g., by rotation of the hand wheel shown) that causes movement of input shaft 11, which turns sun gear 12 and thereby rotates the planet gears 13 around the ring gear 17. However as shown, the prior art apparatus 10 also permits system forces, such as fluid flow in a fluid stream 50 acting on the butterfly valve 40 to back drive the gear set 30 and power source 20. For example, after the butterfly valve 40 has been positioned in the fluid stream 50 and the power removed from the power source 20, the frictional forces in the system 10 may be less than the forces from fluid flow acting on the butterfly, and could back drive the gear set 30 and allow the butterfly valve 40 to move either further open or closed. Such back-driving of the gear set 30 and power source 20 tends to be undesirable for many applications.

Apparatuses and mechanisms are known in the art for locking gears of various types. For example, U.S. Pat. No. 6,766,709 discloses a gear set that uses first and second ratchet cams, each allowing rotation in the opposite direction of the other disposed about a gear member with a helix (worm and gear or helical gear set) that are engaged/disengaged by the force of the operating helical gear acting on selective couplings in between the gear and the ratchet cams. While the apparatus disclosed in the '709 patent may be useful in locking gear sets that are made up helical members the invention is not useful in locking gear sets that have no helical members, i.e. spur gears.

An alternative approach to providing a self-locking gear set is to fabricate a worm and gear set that has a low helix angle, (typically less than 6 degrees) which may be considered self-locking because the frictional forces are greater than the back-driving forces causing them to be self-locking. These systems inherently have low efficiency, (less than 35%). In such systems, the normal force acting on the gear times the coefficient of friction results in tangential force that is typically greater than the opposite tangential force caused by the back-driving force. Inefficient gear sets tend to be disadvantageous in that larger power sources are required to operate the device.

Therefore, there exists a need for a self-locking apparatus for a gear set. In particular, there exists a need for a locking apparatus that automatically locks a gear set, preventing the gear set from being back-driven yet permitting it to be efficiently forward-driven by a power source.

SUMMARY OF THE INVENTION

The present invention provides a self-locking apparatus for a gear set. In particular, the present invention is a locking apparatus that automatically locks a gear set, preventing the gear set from being back-driven yet permitting it to be efficiently forward-driven by a power source. Components configured to enable such locking functionality include one or more differentiating connectors and one or more unidirectional engage/disengage components as described herein.

One embodiment of the invention includes a self-locking device for a planetary gear set configured for being forward-driven in either the first or second rotational directions and an output including the planet carrier disposed to rotate with the input shaft. The device further includes as the unidirectional engage/disengage components as locking wedges that are engaged/disengaged by the action of the differentiating connectors in the form of planet pins in the planet carrier slots in this embodiment, allowing the planet gears in the planet carrier to contact the locking wedges, that allow rotation when being forward driven but prevent rotation when being back driven. In this embodiment of the invention, the device includes first and second releasable locking wedges located on the first and second sides of the planet gears. The first locking wedge, located closest to the clockwise most position of the planet carrier slot and engaged in the planet carrier, when engaged with the planet gear because it has traveled to the clockwise position in the planet carrier slot, allows the planet gear to rotate in the counterclockwise direction but prevents the planet gear from rotating in the clockwise direction. The second locking wedge located closest to the counterclockwise most position of the planet carrier slot and engaged in the planet carrier, when engaged with the planet gear because it has traveled to the counterclockwise side of the pin slot in the planet carrier allows the planet gear to rotate in the clockwise direction but prevents the planet gear from rotating in the counterclockwise direction.

When the input shaft coupled to the sun gear rotates in the clockwise direction it engages the planet gear(s) causing them to rotate in the counterclockwise direction. The planet gears are further engaged with the fixed ring gear which causes them to crawl along its diameter orbiting the sun gear in the clockwise direction. The planet gears are further engaged with the planet carrier through a planet pin and elongated slots in the planet carrier causing the planet gears to move to the clockwise position in the planet slot engaging the first locking wedge. The first locking wedge allows the counterclockwise rotation of the planet gear and the gear set continues to rotate pushing the planet carrier in the clockwise direction.

When the input shaft coupled to the sun gear rotates in the counterclockwise direction it engages the planet gear(s) causing them to rotate in the clockwise direction. The planet gears are further engaged with the fixed ring gear which causes them to crawl along its diameter orbiting the sun gear in the counterclockwise direction. The planet gears are further engaged with the planet carrier through a planet pin and elongated slots in the planet carrier causing the planet gears to move to the counterclockwise position in the planet slot engaging the second locking wedge. The second locking wedge allows clockwise rotation of the planet gear and the gear set continues to rotate pushing the planet carrier in the counterclockwise direction. Thus, the gear set allows input in either the clockwise or counterclockwise directions and results in the output of the planet carrier to rotate with the input shaft.

If there is a back-driving force put on the gear set attempting to move the planet carrier in the clockwise direction, the planet pins and their associated planet gears move to the counterclockwise position in the planet carrier slot engaging the second locking wedge. For the planet carrier to move in the clockwise direction the planet gears must rotate in the counterclockwise direction. The second locking wedge prevents counterclockwise rotation of the planet gear thus locking the gear set from being back driven.

If the back-driving force put on the gear set attempts to move the planet carrier in the counterclockwise direction, the planet pins and their associated planet gears move to the clockwise position in the planet carrier slot engaging the first locking wedge. For the planet carrier to move in the counterclockwise direction the planet gears must rotate in the clockwise direction. The first locking wedge prevents clockwise rotation of the planet gear thus locking the gear set from being back driven.

It will be understood by those of ordinary skill in the art that either or both of the locking wedges may be used thus the gear set is prevented from being back driven in either or both the clockwise or counterclockwise direction.

In another embodiment of the invention, the differentiated action of the differentiating connectors as planet pins in the planet carrier slots will move other forms of unidirectional engage/disengage components such as, for example, brake shoes, ratchets, friction spragues, roll clutches etc. In these mechanisms, the differentiated action is connected to the unidirectional device through linkages designed to disengage the unidirectional device when it would prevent the gear set from being forward driven. Further it would engage the unidirectional device when it would prevent the gear set from being back driven.

In an embodiment of the invention with such an alternative unidirectional engage/disengage component, there is a ratchet mechanism on the top of the gear set that prevents rotation in the clockwise direction and another ratchet mechanism on the bottom of the gear set that prevents counterclockwise rotation. This is achieved by having a ratchet cam profile in the fixed housing that also houses the fixed ring gear. The profile on top allows counterclockwise rotation but prevents clockwise rotation. The profile on the bottom of the gear set allows clockwise rotation but prevents counterclockwise rotation. These cam profiles are engaged/disengaged with a follower mounted to the planet carrier and actuated with the differentiated action of the planet pin in the planet carrier slot.

When the input shaft coupled to the sun gear rotates in the clockwise direction it engages the planet gear(s) causing them to rotate in the counterclockwise direction. The planet gears are further engaged with the fixed ring gear which causes them to crawl along its diameter orbiting the sun gear in the clockwise direction. The planet gears are further engaged with the planet carrier through a planet pin and elongated slots in the planet carrier causing the planet pins to move to the full clockwise position in the planet slot. The motion of the planet pin moving to the full clockwise position acts on the upper ratchet follower, which is pinned to the planet carrier to rotate between the planet pin and the ring gear, causing the upper ratchet follower to rotate in the counterclockwise direction moving the upper ratchet follower out of engagement with the upper fixed ratchet profile. At the same time the motion of the planet pin moving to the full clockwise position acts on the lower ratchet follower, which is pinned to the planet carrier to rotate between the planet pin and the ring gear, causing the lower ratchet follower to rotate in the counterclockwise direction moving the lower ratchet follower into engagement with the lower fixed ratchet profile. A clockwise input to the gear set causes the planet carrier to rotate in the clockwise direction. Because the engaged lower ratchet mechanism allows clockwise rotation and the upper ratchet mechanism is disengaged the gear set is allowed to rotate in the clockwise direction.

When the input shaft coupled to the sun gear rotates in the counterclockwise direction it engages the planet gear(s) causing them to rotate in the clockwise direction. The planet gears are further engaged with the fixed ring gear which causes them to crawl along its diameter orbiting the sun gear in the counterclockwise direction. The planet gears are further engaged with the planet carrier through a planet pin and elongated slots in the planet carrier causing the planet pins to move to the full counterclockwise position in the planet slot. The motion of the planet pin moving to the full counterclockwise position acts on the upper ratchet follower, which is pinned to the planet carrier to rotate between the planet pin and the ring gear, causing the upper ratchet follower to rotate in the clockwise direction moving the upper ratchet follower into engagement with the upper fixed ratchet profile. At the same time the motion of the planet pin moving to the full counterclockwise position acts on the lower ratchet follower, which is pinned to the planet carrier to rotate between the planet pin and the ring gear, causing the lower ratchet follower to rotate in the clockwise direction moving the lower ratchet follower out of engagement with the lower fixed ratchet profile. A counterclockwise input to the gear set causes the planet carrier to rotate in the counterclockwise direction. Because the upper ratchet mechanism allows counterclockwise rotation and the lower ratchet mechanism is disengaged the gear set is allowed to rotate in the counterclockwise direction.

If there is a back-driving force put on the gear set attempting to move the planet carrier in the counterclockwise direction, the planet pins move to the full clockwise position in the planet carrier slot. The motion of the planet pin moving to the full clockwise position acts on the upper ratchet follower, which is pinned to the planet carrier to rotate between the planet pin and the ring gear, causing the upper ratchet follower to rotate in the counterclockwise direction moving the upper ratchet follower out of engagement with the upper fixed ratchet profile. At the same time the motion of the planet pin moving to the full clockwise position acts on the lower ratchet follower, which is pinned to the planet carrier to rotate between the planet pin and the ring gear, causing the lower ratchet follower to rotate in the counterclockwise direction moving the lower ratchet follower into engagement with the lower fixed ratchet profile. Because the lower ratchet mechanism does not allow counterclockwise rotation the gear set is not allowed to rotate in the counterclockwise direction.

If there is a back-driving force put on the gear set attempting to move the planet carrier in the clockwise direction, the planet pins move to the full counterclockwise position in the planet carrier slot. The motion of the planet pin moving to the full counterclockwise position acts on the upper ratchet follower, which is pinned to the planet carrier to rotate between the planet pin and the ring gear, causing the upper ratchet follower to rotate in the clockwise direction moving the upper ratchet follower into engagement with the upper fixed ratchet profile. At the same time the motion of the planet pin moving to the full counterclockwise position acts on the lower ratchet follower, which is pinned to the planet carrier to rotate between the planet pin and the ring gear, causing the lower ratchet follower to rotate in the clockwise direction moving the lower ratchet follower out of engagement with the lower fixed ratchet profile. Because the upper ratchet mechanism does not allow clockwise rotation the gear set is not allowed to rotate in the clockwise direction.

These and other advantages of the present invention will become apparent to those of skill in the art upon review of the following detailed description, the accompanying drawings and the appended claims.

DETAILED DESCRIPTION OF THE INVENTION

The present invention addresses the need for a self-locking device or gear set. Referring briefly to the accompanying figures, embodiments of this invention include an apparatus that substantially prevents a gear set from being back driven while permitting the gear set to be efficiently forward driven. Exemplary embodiments of the self-locking device include a unidirectional engage/disengage component combined with a differentiating connector that allow forward driving while preventing undesired back driving. A first and second locking/unlocking wedge described herein as one form of a unidirectional engage/disengage component on either side of a planet gear in an epicyclic gear set in combination with a planet pin in a slot that is a differentiating connector in a planet carrier to facilitate selective coupling/decoupling of the locking wedges that permits forward driving while preventing back driving. The locking wedges are disposed to substantially allow rotation of the gear in opposite directions, i.e. one of the locking wedges allows the planet to rotate substantially free in the clockwise direction while the other locking wedge substantially allows rotation in the counterclockwise direction. These locking wedges are engaged/disengaged with the planet gear by the planet gear moving based on the planet gear pins position in the planet carrier slot. Certain embodiments of this locking device of this invention may be useful in a gearbox for use in, for example, valve applications and winch applications.

Exemplary embodiments of this invention advantageously provide a self-locking device that substantially prevents the system from being back driven in either or both directions, while simultaneously allowing the gear set to be forward driven in either direction. Further the exemplary embodiment of this invention allows gear sets of very high efficiency (up to 99%) to additionally be self-locking. This significantly reduces the power consumption to operate the actuated device. These and other benefits will become evident in light of the following discussion of various embodiments thereof.

Figure 1:
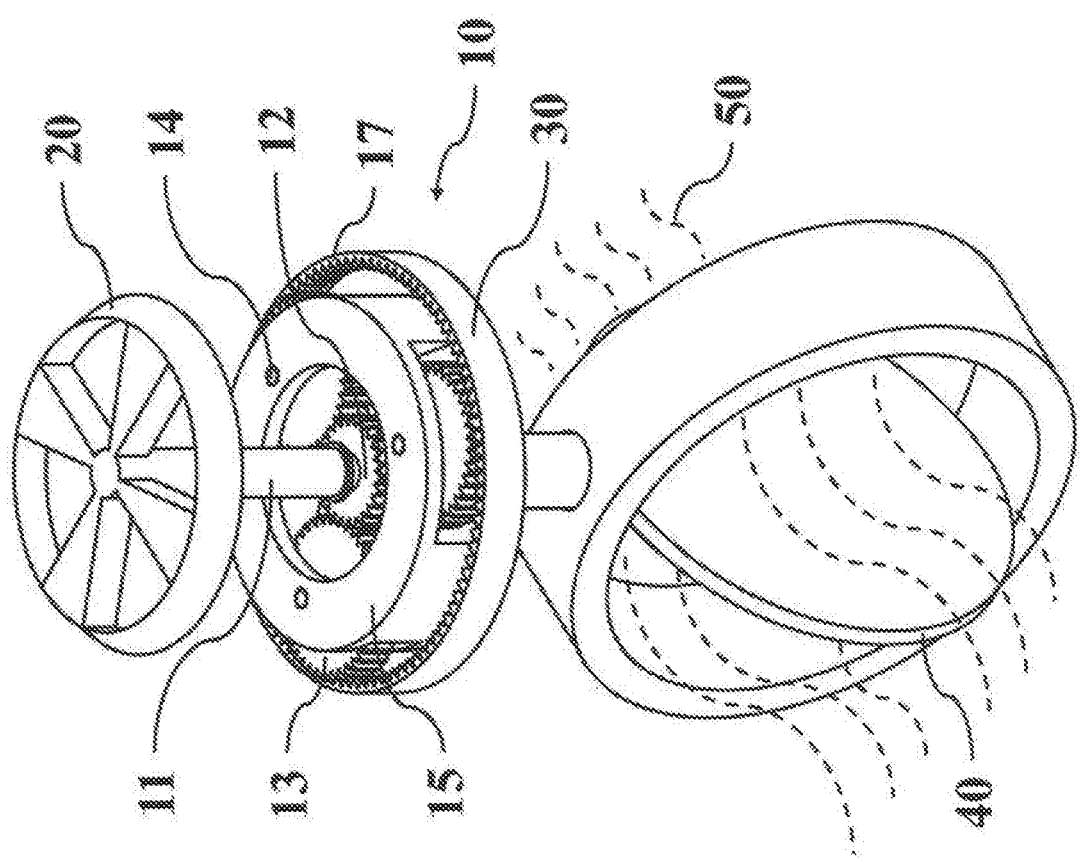
FIG. 1 is a top perspective view of a planet gear without lock arrangement of the prior art coupled to a power source to rotate a butterfly valve.
Figure 2:
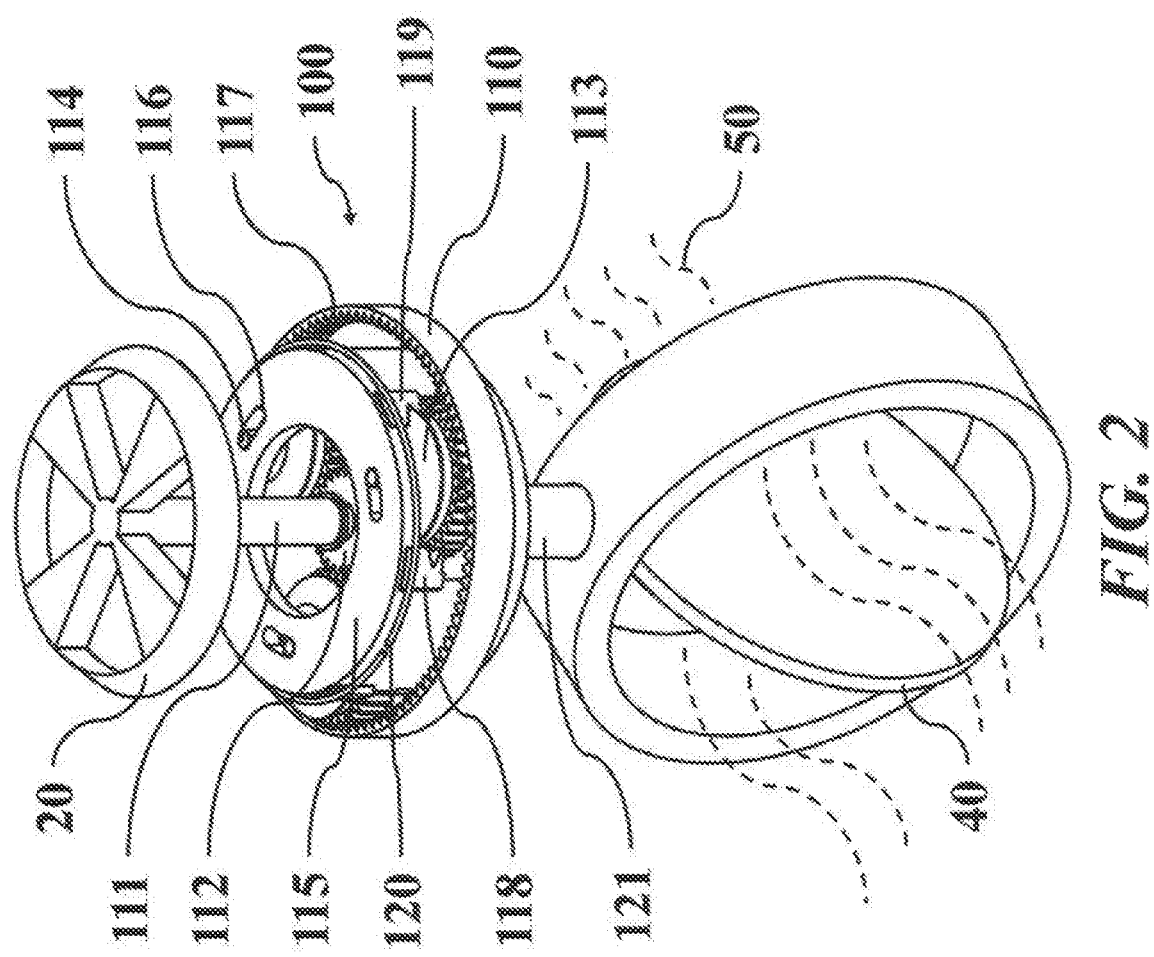
FIG. 2 is a top perspective view of a first embodiment of a planet gear with lock arrangement of the present invention coupled to a power source to rotate a butterfly valve.

Referring now to FIGS. 2-5, exemplary embodiments of the present invention are illustrated. FIG. 2 schematically illustrates one exemplary embodiment of a locking gear set 110 as a component of automatic locking apparatus 100. Apparatus 100 only has in common with prior art apparatus 10 described above with respect to FIG. 1 the power source 20 coupled to a gear set, which in turn is coupled to an actuated device such as butterfly valve 40. Apparatus 100 is distinct from apparatus 10 in that its locking gear set 110 includes additional elements of one or more planet carrier slots 116, one or more first locking wedges 118, one or more second locking wedges 119, one or more retention springs 120 and modified planet gears 113, that act in combination to substantially prevent the valve 40 from being back driven by the forces caused by flow 50 on the butterfly valve 40, while permitting it to be forward driven by the power source 20. These additional elements along with one or more planet pins 114 retained in a corresponding number of planet carrier slots 116 provide for the locking functionality described herein. The locking gear set 110 may comprise more or fewer gears 113 than illustrated without deviating from the invention. Each gear 113 includes a corresponding one of the first locking wedge 118, the second locking wedge 119, the planet pin 114 and the carrier slot 116.

It will be understood by those of ordinary skill in the art that the locking gear set 110 of the present invention, as well as other embodiments of the locking arrangement of the present invention, is not limited to use with the butterfly valve 40 as shown in FIG. 2. Embodiments of the locking arrangement of the locking gear set 110 may be equally well suited in substantially any application in which it is desirable to automatically lock and unlock a gear set to prevent it from being back driven, such as, for example, damper controls, gear sets holding potential energy from a source such as a spring, jack screws with high efficiency screws, winches, cranes, speed control devices, and the like. It will also be understood that while representative embodiments of this invention depict the inclusion of three gears in a planetary gear set, the invention may be used with any epicyclic gear set and with any number of gears.

Figure 3:
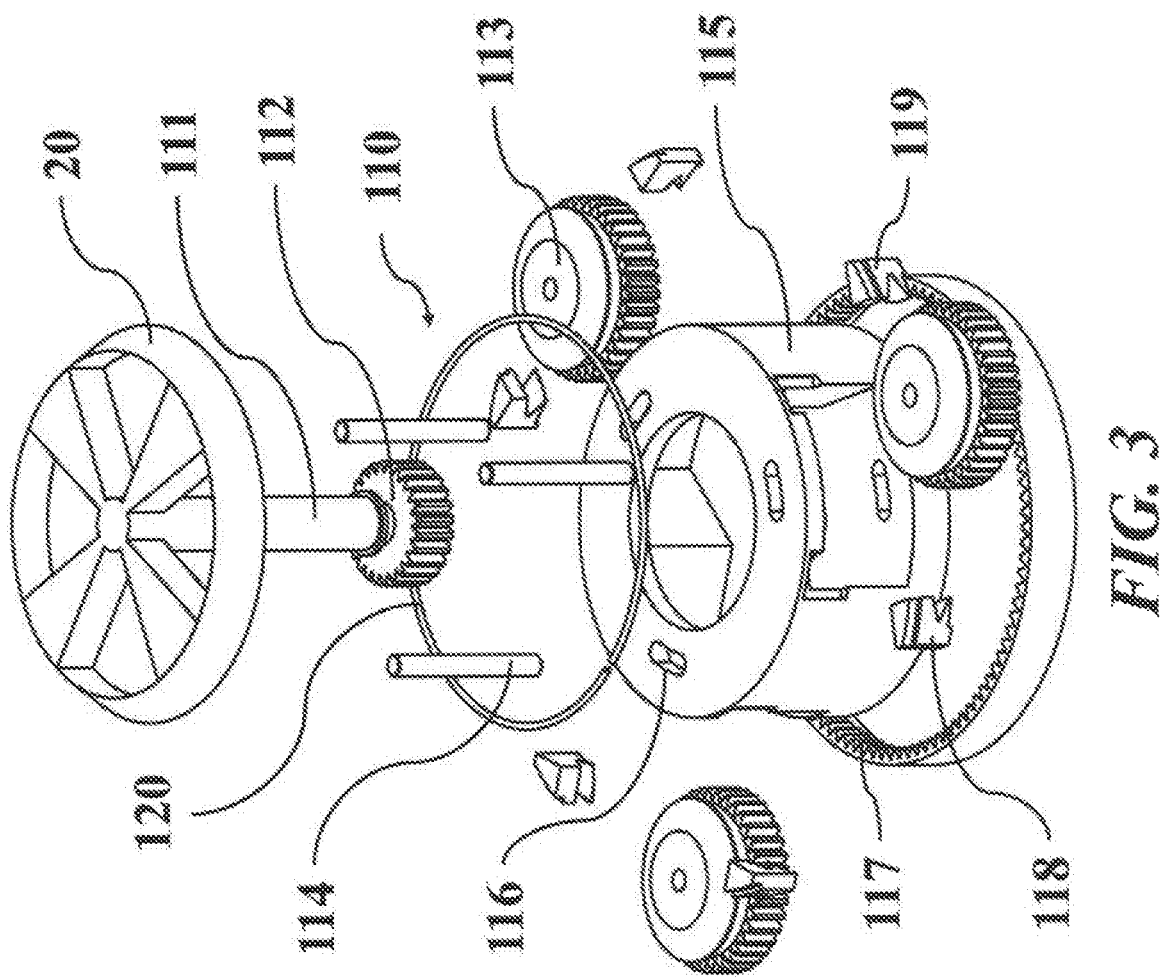
FIG. 3 is an exploded view of the planet gear with lock arrangement of FIG. 2.

Referring now to FIGS. 2 and 3, the structure and function of a first exemplary embodiment of the locking gear set 110 is described in more detail. It will be understood that all references to rotational direction are as viewed from the power source 20 down to input shaft 111. The locking gear set 110 is a self-locking epicyclic gear set, which includes the input shaft 111 coupled to sun gear 112, which engages the planet gears 113, which engage fixed ring gear 117 while simultaneously engaging the planet pins 114 that move in respective planet carrier pin slots 116, which are elongated, in the planet carrier 115, which is the output member of the locking gear set 110 as it is engaged with output shaft 121 coupled to butterfly valve 40 in this example representation of the apparatus. That arrangement provides for developing output rotation when rotation is applied to input shaft 111 through movement of the power source 20. Further, the first and second releasable locking wedges, 118 and 119 respectively, engage the planet carrier 115 and alternately engage/disengage the planet gear 113. The first and second locking wedges 118 and 119 are retained in the assembly by retention spring ring 120. It is noted that each planet gear 113 of the planet gear set 110 includes one each of the first locking wedge 118 and the second locking wedge 119.

The term locking wedge as used herein includes nominally any unidirectional engage/disengage mechanism that can substantially engage the planet gear 113 in a manner that allows movement in one direction (rotational movement in this example) but prevents movement in the opposing direction or in an undesired way in the same direction due to mechanical engagement or frictional engagement, for example. Examples such wedges include, but are not limited to, cam and pawl ratchets, flat friction wedges, and conical friction wedges, and systems presently known to those skilled in the art and/or which may be devised hereafter. As described in more detail below, the embodiments shown and described include locking wedges 118 and 119 that engage/disengage each planet gear 113 of the gear set 110 when it has traveled along the planet carrier slot 116 until it engages the locking wedge 118 or 119 or has reached the end of the slot 116 contacting the planet carrier 115 causing it to rotate. When the rotation of the planet gear 113 pulls the engaged locking wedge 118 into the planet carrier 115, it substantially prevents rotation of the planet gear 113. When the rotation of the planet gear 113 pushes the engaged locking wedge 118 away from the planet carrier 115, it substantially allows the planet gear 113 to rotate.

While the above discussion pertaining to the operation of exemplary embodiments of this invention considers the locking gear set 110 at rest, it will be understood that the operation of the locking gear set 110 is not limited in this regard. Rather, embodiments of this invention may operate to prevent system forces from back-driving the gear set 110, while substantially allowing the device to be forward driven. Embodiments of this invention may therefore be advantageous in apparatuses in which it is desirable to control the rate of rotation of the gear set 110; i.e., in the case of the butterfly valve 40. In such an application, prior art apparatuses typically require the power supply 20 to provide both the torque necessary to open the valve 40 and to provide the torque to overcome the dynamic system forces from the stream 50. Hence, if upon partially opening the valve 40, the system forces act to rapidly further open the valve 40, it is typically necessary for the power supply 20 to equally rapidly oppose those system forces, (i.e., to provide braking force.)

Exemplary embodiments of this invention are advantageous in that they automatically oppose the above described system force, only permitting the valve 40, or any other element to be moved within the limitations described herein, to operate by the action of the power supply 20. Such function may advantageously reduce complexity; e.g., as a result of feedback loops and the like reducing fabrication costs. Further if the power supply 20 is a hand wheel this invention increases human safety by not requiring power input throughout the valve stroke.

When counterclockwise (all rotational directions are to be as viewed from the power source 20 through the input shaft 111) power is applied to the power source 20, which is connected to the input shaft 111 coupled to the sun gear 112 causing it to rotate in the counterclockwise direction. The sun gear 112 engages the planet gears 113 causing them to rotate in the clockwise direction. The planet gears 113 are further engaged with the fixed ring gear 117, which causes the planet gears 113 to crawl along the ring gear's inner diameter orbiting the sun gear 112 in the counterclockwise direction. The planet gears 113 are further engaged with the planet carrier 115 through their respective planet pins 114 in the planet carrier 115 in their corresponding planet carrier slots 116 of the planet carrier 115 causing the planet pins 114 to move to the counterclockwise position in the planet slot 116. The planet pins 114 may move fully to the counterclockwise position or partially to that position. That is, the planet pins 114 move translationally within the planet carrier slots 116 partially or completely to the counterclockwise position of the planet carrier slots 115. The motion of the planet pins 114 and corresponding planet gears 113 moving to the counterclockwise position in the planet carrier slots 116 engages the second locking wedges 119 of respective gears 113. Because the planet gear 113 is rotating in the clockwise direction, it pushes the second locking wedge 119 of its locking wedge pair out of engagement and the gear set 110 is allowed to rotate in the counterclockwise direction.

When there is a back-driving force put on the gear set 110 into the output member (the planet carrier 115 in this example) attempting to move it in the counterclockwise direction, the planet pins 114 and the planet gears 113 move to the clockwise position in the one or more planet carrier slots 116. The motion of the planet pins 114 and the planet gears 113 moving to the clockwise position in the planet carrier slots 116 causes them to engage the first locking wedge 118. Because the planet gears 113 are attempting to rotate in the clockwise direction, they pull the first locking wedges 118 further into engagement and the gear set 110 is prevented from rotating in the clockwise direction.

When clockwise power is applied to the power source 20, which is connected to the input shaft 111 coupled to the sun gear 112, the sun gear 112 rotates in the clockwise direction. The sun gear 112 engages the planet gears 113, causing them to rotate in the counterclockwise direction. The planet gears 113 are further engaged with the fixed ring gear 117, which causes the planet gears 113 to crawl along the ring gear's diameter orbiting the sun gear 112 in the clockwise direction. The planet gears 113 are further engaged with the planet carrier 115 through the planet pins 114 in the planet carrier slots 116 of the planet carrier 115, causing the planet pins 114 to move to or remain in the clockwise position in the planet carrier slots 116. The planet pins 114 may move fully to the clockwise position or partially toward that position. That is, the planet pins 114 move translationally within the planet carrier slots 116 partially or completely to the clockwise position of the carrier slots 115. The motion of the planet pins 114 and planet gears 113 moving to or remaining in the clockwise position in the planet carrier slots 116 causes them to engage the first locking wedges 118 of each of the planet gears 113. Because the planet gears 113 are rotating in the counterclockwise direction, the first locking wedges 118 are pushed out of engagement and the gear set 110 is allowed to rotate in the clockwise direction.

When there is a back-driving force put on the gear set 110 into the output member (the planet carrier 115 in this example) attempting to move it in the clockwise direction, the planet pins 114 and planet gears 113 move to the counterclockwise position in the planet carrier slots 116. The motion of the planet pins 114 and planet gears 113 moving to the counterclockwise position in the planet carrier slots 116 causes them to engage the second locking wedges 119. Because the planet gears 113 are attempting to rotate in the counterclockwise direction, the second locking wedges 119 are pulled into engagement and the gear set 110 is prevented from rotating in the clockwise direction.

It will be understood by those of ordinary skill in the art that either or both of the first and second locking wedges 118 and 119 may be used, thus the gear set 110 is prevented from being back driven in either or both the clockwise or counterclockwise direction. It will be further understood that if the planet pins 114 are in position in the planet carrier slots 116 due to the action of the power source 20 or the action of the carrier 115 as the output, they will not need to move further for the locking wedges 118/119 to prevent back driving.

Figure 2A:
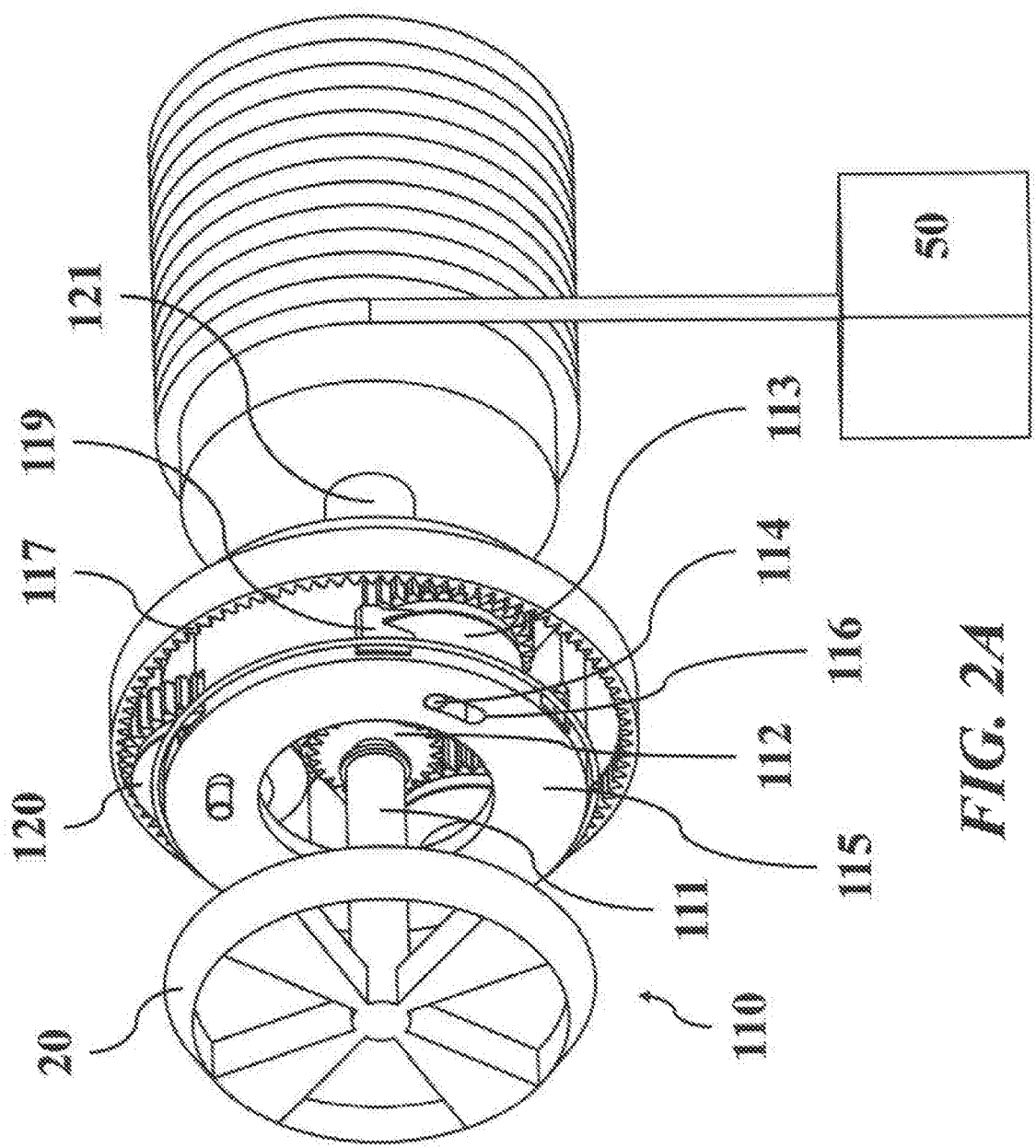
FIG. 2A is a top perspective view of the first embodiment of the present invention coupled to a load to be moved vertically.

An example of a device that would only use one of the two locking wedges 118/119 to prevent back driving would be a lifting winch as shown in FIG. 2A. In this case, the device would only use the second locking wedge 119. To lift load 50, a counterclockwise force would be put into the power source 20, rotating the input shaft 111 and the sun gear 112 in the counterclockwise direction. The sun gear 112 engages the planet gears 113, causing them to rotate in the clockwise direction. The planet gears 113 are further engaged with the fixed ring gear 117, which causes the planet gears 113 to crawl along the ring gear's inner diameter orbiting the sun gear 112 in the counterclockwise direction. The planet gears 113 are further engaged with the planet carrier 115 through the one or more planet pins 114 in the planet carrier 115 in the corresponding one or more planet carrier slots 116 of the planet carrier 115 causing the planet pins 114 to move to or be in the counterclockwise position in the planet slots 116. The motion of the planet pins 114 and corresponding planet gears 113 moving to the counterclockwise position in the planet carrier slots 116 engages the second locking wedges 119 of respective ones of the planet gears 113. Because the planet gears 113 are rotating in the clockwise direction, they push the respective second locking wedges 119 out of engagement and the gear set 110 is allowed to rotate in the counterclockwise direction, thereby lifting the load 50.

With continuing reference to FIG. 2A, when the power is removed from the input 20, the load 50 will create a back-driving force. The back-driving force caused by the load 50 will cause the planet carrier 115 to attempt to rotate in the clockwise direction. The planet pins 114 and their corresponding planet gears 113 are already in the counterclockwise position in the planet carrier slots 116 and engaged with the second locking wedges 119. The planet gears 113 will attempt to rotate in the counterclockwise direction pulling the second locking wedges 119 further into engagement. The second locking wedges 119 do not allow counterclockwise rotation thus, the gear set 110 is locked and will hold the load 50 in position.

The load 50 is lowered by applying a clockwise force to the power supply 20, which is connected to the input shaft 111 coupled to the sun gear 112 and the sun gear 112 rotates in the clockwise direction. The sun gear 112 engages the planet gears 113, causing it to rotate in the counterclockwise direction. The planet gears 113 are further engaged with the fixed ring gear 117, which causes the planet gears 113 to crawl along the ring gear's diameter orbiting the sun gear 112 in the clockwise direction. The planet gears 113 are further engaged with the planet carrier 115 through the planet pins 114 in the planet carrier slots 116 of the planet carrier 115, causing the planet pins 114 to move toward the clockwise position in the planet carrier slots 116. The motion of the planet pins 114 and planet gears 113 moving toward the clockwise position in the planet carrier slots 116 cause them to disengage the second locking wedges 119 of each of the planet gears 113. As the planet gears 113 move out of engagement with the second locking wedges 119, they will be permitted to rotate in the counterclockwise direction and crawl along the ring gear 117 in the clockwise direction, thereby lowering the load 50.

When the power is removed from the power supply 20, the load 50 will create a back-driving force. The back-driving force caused by the load 50 will cause the planet carrier 115 to attempt to rotate in the clockwise direction. The planet pins 114 and their corresponding planet gears 113 will move in the counterclockwise direction in the planet carrier slots 116 and engage with the second locking wedges 119. The planet gears 113 will attempt to rotate in the counterclockwise direction, pulling the second locking wedges 119 further into engagement. The second locking wedges 119 do not allow counterclockwise rotation thus, the gear set 110 is locked and will hold the load 50.

Figure 4:
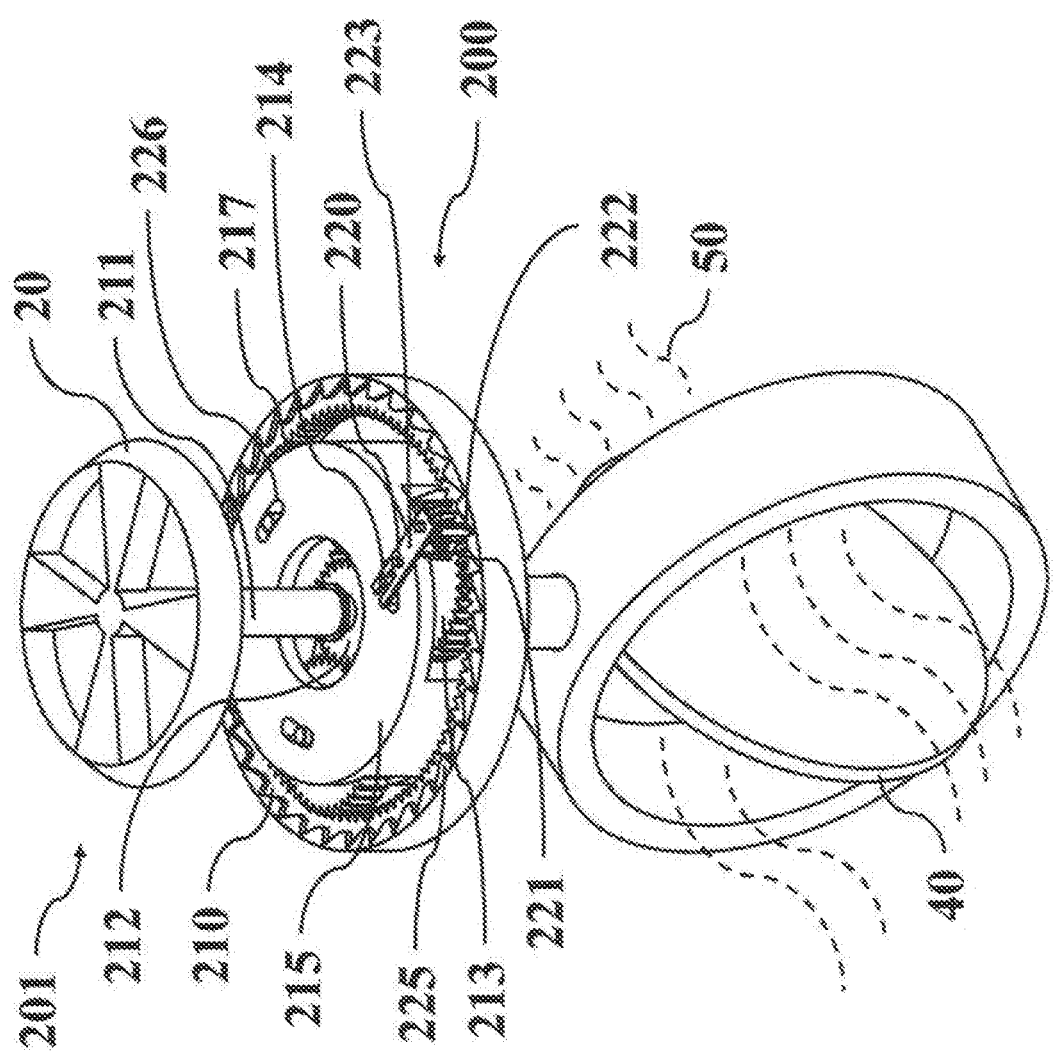
FIG. 4 is a top perspective view of a second embodiment of a planet gear with lock arrangement of the present invention coupled to a power source to rotate a butterfly valve.
Figure 4A:
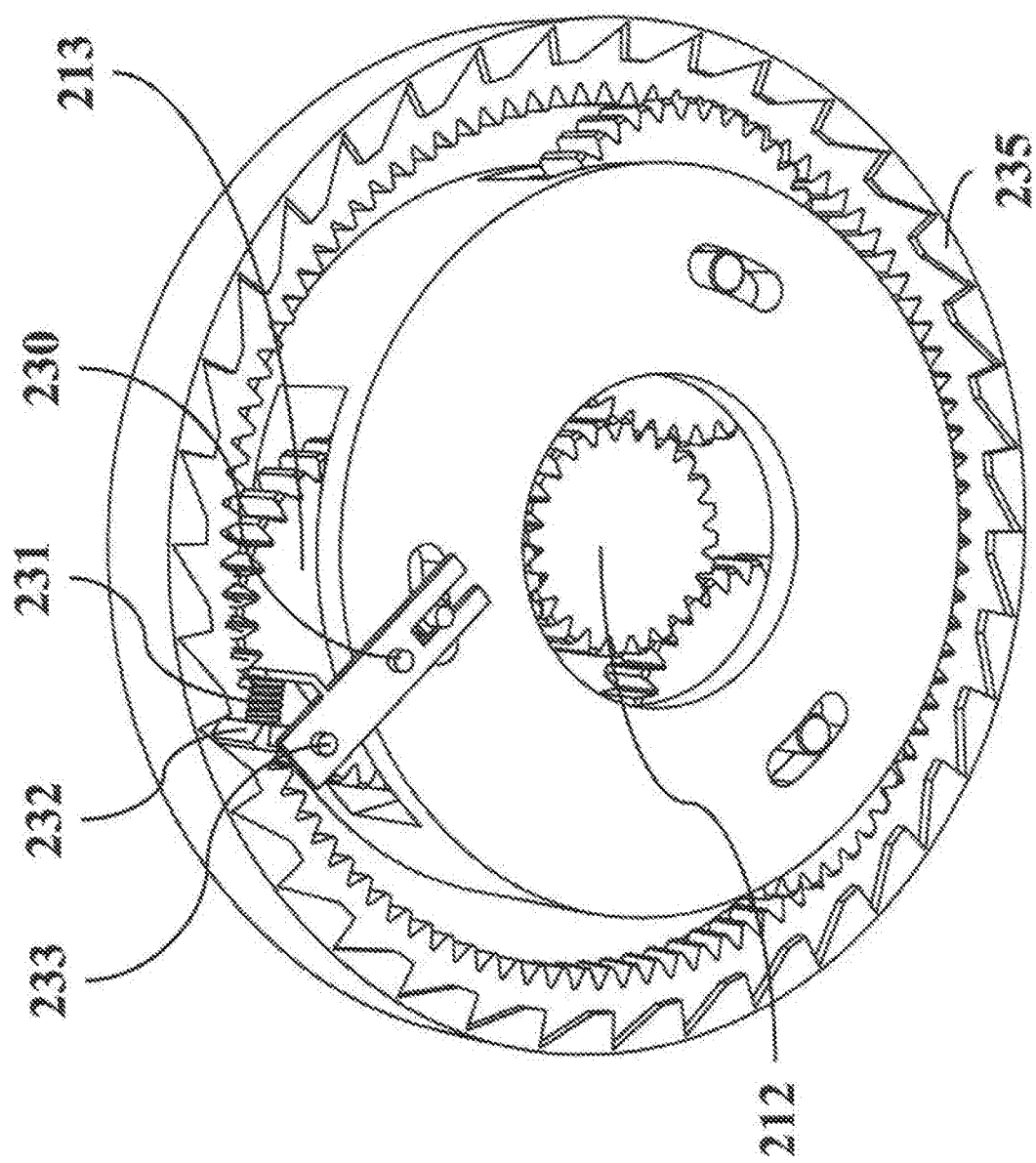
FIG. 4A is a bottom perspective view of the planet gear with lock arrangement of FIG. 4.
Figure 5:
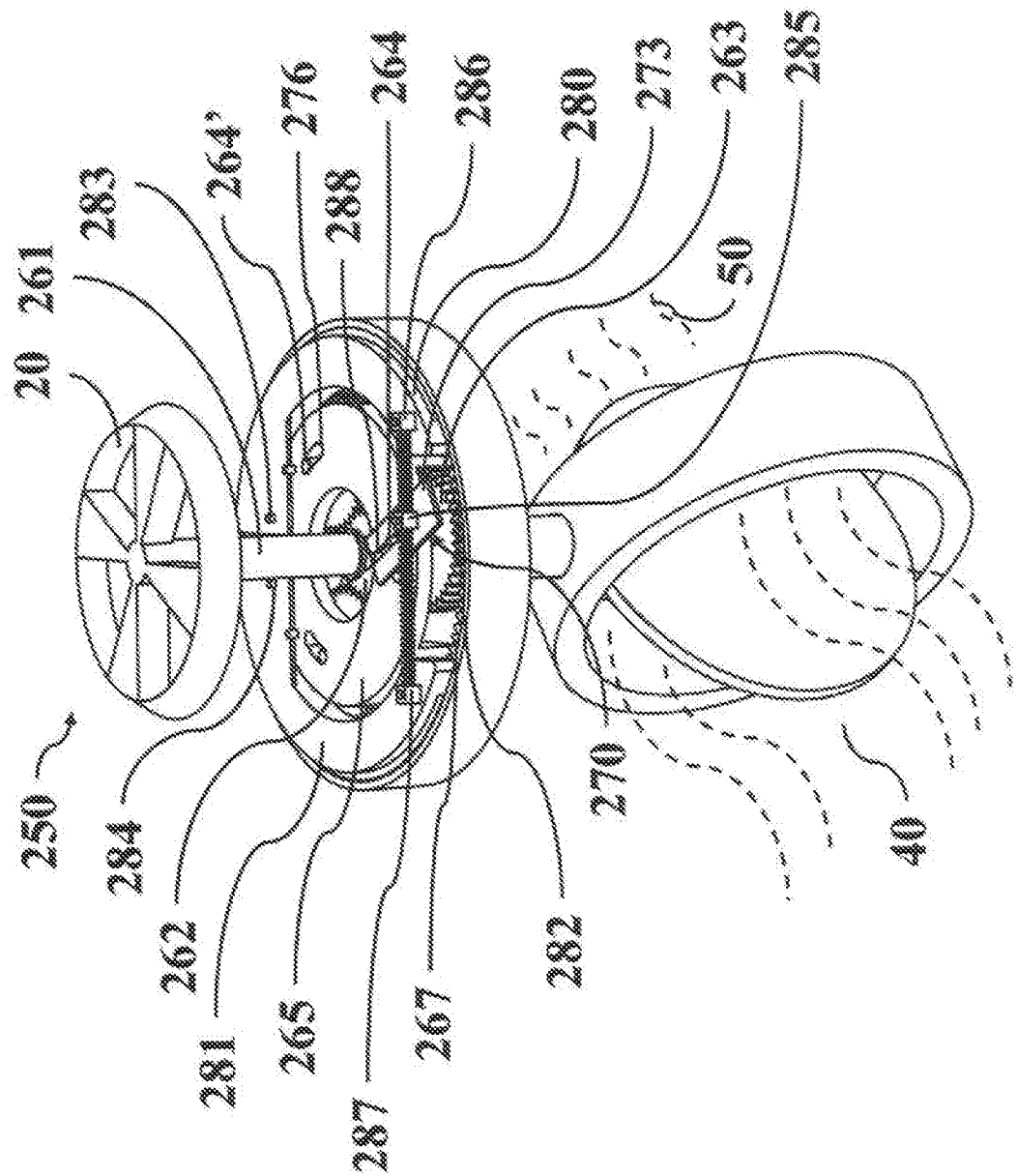
FIG. 5 is a top perspective view of a third embodiment of a planet gear with lock arrangement of the present invention coupled to a power source to rotate a butterfly valve.

Referring now to FIGS. 4A and 4B, a second embodiment of the automatic locking apparatus of the present invention is shown. Locking apparatus 200 is configured for controlling a device like a butterfly valve or any other commonly known device that has back-driving forces that must be controlled. Locking apparatus 200 is similar to locking apparatus 100 in that it relates to an epicyclic gear set, and relies on the action of a differentiating connector in the form of planet pin 214 moving in a planet carrier slot 226 to engage/disengage a unidirectional engage/disengage component such as unidirectional direction limiter 201 comprising first and second ratchet cams 225 and 235, first and second springs 221 and 231, and first and second pawls 222 and 232 shown.

Apparatus 200 includes epicyclic gear set 210 and input shaft 211 coupled to sun gear 212. The sun gear 212 engages one or more planet gears 213 of the gear set 210, which planet gears 213 engage fixed ring gear 217 while simultaneously engaging corresponding planet pins 214 that move in corresponding planet carrier pin slots 226 of planet carrier 215 (also referred to herein as the output member), developing output rotation when rotation is applied to input shaft 211. Further, each of the planet pins 214 engages an upper ratchet mechanism portion of the unidirectional engage/disengage component made up of upper ratchet followers 223 that are predisposed to rotate about upper carrier pins 220, respectively, moving spring loaded pawl 222 into and out of engagement with first ratchet cam 225. Further, each of the planet pins 214 engages a lower ratchet mechanism made up of rotating linkages 233 that are predisposed to rotate about lower carrier pins 230, respectively, moving spring loaded pawl 232 into and out of engagement with ratchet cam 235. The upper ratchet mechanism is predisposed to allow rotation in the counter clockwise direction but substantially preventing rotation in the clockwise direction when engaged, and the lower ratchet mechanism is predisposed to allow rotation in the clockwise direction and substantially prevent rotation in the counter clockwise direction when it is engaged.

When counterclockwise (all rotational directions are to be as viewed from the power source 20 through the input shaft 211) power is applied to the power source 20, which is connected to the input shaft 211 that is coupled to the sun gear 212, the sun gear 212 rotates in the counterclockwise direction. The sun gear 212 engages the one or more planet gears 213, causing them to rotate in the clockwise direction. The planet gears 213 are further engaged with the fixed ring gear 217, which causes the planet gears 213 to crawl along the ring gear's diameter orbiting the sun gear 212 in the counterclockwise direction. Each of the one or more planet gears 213 is further engaged with the planet carrier 215 through planet pins 214 in the carrier pin slots 226 in the planet carrier 215, causing the planet gears 213 to move to the full counterclockwise position in the carrier pin slots 226. The motion of the planet pins 214 moving to the counterclockwise position in the planet carrier slots 226 acts on the upper ratchet followers 223, which are pinned with upper carrier pins 220 to the planet carrier 215 to rotate between the planet pins 214 and the ring gear 217, causing the upper ratchet followers 223 to rotate in the clockwise direction and thereby moving the upper ratchet followers 223 into engagement with the first ratchet cam 225. At the same time, the motion of the planet pins 214 moving to the counterclockwise position acts on the lower ratchet followers 233, which are pinned by lower carrier pins 230 to the planet carrier 215 to rotate between the planet pins 214 and the ring gear 217, causing the lower ratchet followers 233 to rotate in the clockwise direction moving the lower ratchet followers 233 out of engagement with the second ratchet cams 235. A counterclockwise input to the gear set 210 causes the planet carrier 215 to rotate in the counterclockwise direction. Because the engaged upper ratchet mechanism allows counterclockwise rotation and the lower ratchet mechanism is disengaged, the gear set 210 is allowed to rotate in the counterclockwise direction.

If there is a back-driving force as defined herein put on the gear set 210 into the carrier 215 representing an output member attempting to move it in the clockwise direction, the planet pins 214 move to the counterclockwise position in the planet carrier slots 226. The motion of the planet pins 214 moving to the full counterclockwise position acts on the upper ratchet followers 223, which are pinned by carrier pins 220 to the planet carrier 215 to rotate between the planet pins 214 and the ring gear 217. This causes the upper ratchet followers 223 to rotate in the clockwise direction, moving the upper ratchet followers 223 into engagement with the first ratchet cams 225. At the same time, the motion of the planet pins 214 moving to the full counterclockwise position acts on the lower ratchet followers 233, which are pinned by lower carrier pins 230 to the planet carrier 215, to rotate between the planet pins 214 and the ring gear 217, causing the lower ratchet followers 233 to rotate in the clockwise direction moving the lower ratchet followers 233 out of engagement with the second ratchet cams 235. Because the upper ratchet mechanism does not allow clockwise rotation, the gear set 210 is not allowed to rotate in the clockwise direction.

When clockwise (all rotational directions are to be as viewed from the power source 20 through the input shaft 211) power is applied to the power source 20, which is connected to the input shaft 211 coupled to the sun gear 212, the sun gear 212 rotates in the clockwise direction. The sun gear 212 engages the planet gears 213, causing them to rotate in the counterclockwise direction. The planet gears 213 are further engaged with the fixed ring gear 217, which causes the planet gears 213 to crawl along the ring gear's diameter orbiting the sun gear 212 in the clockwise direction. The planet gears 213 are further engaged with the planet carrier 215 through planet pins 214 in carrier slots 226 in the planet carrier 215, causing the planet gears 213 to move to the clockwise position in the respective carrier slots 226. The motion of the planet pins 214 moving to the clockwise position in the carrier slots 226 acts on the upper ratchet followers 223, which are pinned by upper carrier pins 220 to the planet carrier 215 to rotate between the planet pins 214 and the ring gear 217. This causes the upper ratchet followers 223 to rotate in the counterclockwise direction, moving the upper ratchet followers 223 out of engagement with the first ratchet cams 225. At the same time, the motion of the planet pins 214 moving to the full clockwise position acts on the lower ratchet followers 233, which are pinned by lower carrier pins 230 to the planet carrier 215 to rotate between the planet pins 214 and the ring gear 217. This causes the lower ratchet followers 233 to rotate in the counterclockwise direction, moving the lower ratchet followers 233 into engagement with the second ratchet cams 235. A clockwise input to the gear set 210 causes the planet carrier 215 to rotate in the clockwise direction. Because the engaged lower ratchet mechanism allows clockwise rotation and the upper ratchet mechanism is disengaged, the gear set 210 is allowed to rotate in the clockwise direction.

If there is a back-driving force put on the gear set 210 into the planet carrier 215 attempting to move it in the counterclockwise direction, the planet pins 214 move to the clockwise position in the planet carrier slots 226. The motion of the planet pins 214 moving to the clockwise position acts on the upper ratchet followers 223, which are pinned by upper carrier pins to the planet carrier 215 to rotate between the planet pins 214 and the ring gear 217. This causes the upper ratchet followers 223 to rotate in the counterclockwise direction, moving the upper ratchet followers 223 out of engagement with the first ratchet cams 225. At the same time, the motion of the planet pins 214 moving to the full clockwise position acts on the lower ratchet followers 233, which are pinned by lower carrier pins 230 to the planet carrier 215, to rotate between the planet pins 214 and the ring gear 217, causing the lower ratchet followers 233 to rotate in the counterclockwise direction moving the lower ratchet followers 233 into engagement with the second ratchet cams 235. Because the lower ratchet mechanism does not allow counterclockwise rotation, the gear set 210 is not allowed to rotate in the counterclockwise direction.

The artisan of ordinary skill will readily recognize that embodiments of automatic self-locking apparatus 200 are not limited to the ratchet cam and follower type unidirectional device configurations provided as examples herein. For example, referring to FIG. 5, a third embodiment of an automatic locking gear apparatus 250 of this invention is described. Apparatus 250 is substantially identical to apparatus 200 of FIGS. 4A and 4B with the exception that the upper and lower ratchet followers 223/233 and the first and second fixed ratchet cams 225/235 are replaced with brake shoes 280 and 281 acting on fixed brake drum 282, which act as the unidirectional engage/disengage component in this embodiment of this invention. An artisan of ordinary skill knows that a brake shoe and drum arrangement is predisposed to prevent rotation in one direction significantly better than it does in the other direction due to the friction forces acting on the shoe in the effective direction to pull the shoe further into contact with the drum. This increases the braking force while, when the shoe rotates in the non-effective direction, the friction forces cause the shoe to be pushed away from the contact eliminating the braking forces.

It will further be understood by those of ordinary skill in the art that either or both of the ratchet mechanisms described may be used; thus, the gear set is prevented from being back driven as that term has been previously described herein in either or both the clockwise or counterclockwise direction.

The apparatus 250 includes self-locking epicyclic gear set 260 and an input shaft 261, both of which are coupled to sun gear 262. Sun gear 262 engages planet gears 263 of the gear set 260, which planet gears 263 engage fixed ring gear 267 while simultaneously engaging one or more planet pins 264 that move in planet carrier pin slots 276. The planet pins 264 contact planet carrier 265 (the output member), developing output rotation when rotation is applied to the input shaft 261. Further, the planet pins 264 engage brake actuator 270 made up of rotating linkage 273 that are predisposed to rotate about pin 264, respectively, moving spring loading/unloading block 285 proximal to and distal to brake actuation blocks 286 and 287, respectively, and reversibly with clockwise or counter clockwise input. Brake shoe 280 is predisposed to allow rotation in the counter clockwise direction but substantially predisposed to prevent rotation in the clockwise direction when actuated, and brake shoe 281 is predisposed to allow rotation in the clockwise direction but substantially predisposed to prevent rotation in the counter clockwise direction when actuated.

When counterclockwise (all rotational directions are to be as viewed from the power source 20 through the input shaft 261) power is applied to the power source 20, which is connected to the input shaft 261 that is coupled to the sun gear 262, the sun gear 262 rotates in the counterclockwise direction. The sun gear 262 engages the planet gears 263, causing them to rotate in the clockwise direction. The planet gears 263 are further engaged with the fixed ring gear 267, which causes the planet gears 263 to crawl along the ring gear's diameter orbiting the sun gear 262 in the counterclockwise direction. The planet gears 263 are further engaged with the planet carrier 265 through planet pins 264 in elongated carrier slots 276 in the planet carrier 265, causing the planet pins 264 to move to the counterclockwise position in the carrier slots 276. The motion of the planet pins 264 moving to the full counterclockwise position in the carrier slots 276 acts on the break actuator 270, which is caused to rotate in the counter clockwise direction by carrier pin 288, moving the spring loading/unloading block 285 closer to brake shoe actuating block 286 and further from brake shoe actuating block 287. This action causes brake shoe 280 to be actuated and pushed into brake drum 282 and break shoe 281 to be pulled from contact with brake drum 282. Because the brake shoes 280 and 281 are attached to the planet carrier 265, which will rotate in the counterclockwise direction when there is counterclockwise power applied to the input shaft 261, the brake shoes 280 and 281 will rotate counterclockwise inside the break drum 282. Because the friction force on actuated brake shoe 280 causes it to rotate about pin 283 in the clockwise direction, it releases the brake shoe 280 and it allows the planet carrier 265 to rotate in the desired counterclockwise direction.

If there is a back-driving force put on the gear set 260 into the planet carrier 265 attempting to move it in the clockwise direction, the planet pins 264 move to the full counterclockwise position in carrier slots 276. The motion of the planet pins 264 moving to the full counterclockwise position in the carrier slots 276 acts on the break actuator mechanism 270, which is caused to rotate in the counterclockwise direction by pin 288, moving the spring loading/unloading block 285 closer to brake shoe actuating block 286 and further from brake actuating block 287. This action causes brake shoe 280 to be actuated and pushed into brake drum 282 and break shoe 281 to be pulled from contact with brake drum 282. Because the brake shoes 280 and 281 are attached to the planet carrier 265, which is being back driven in the clockwise direction, the brake shoes 280 and 281 will attempt to rotate clockwise inside the brake drum 282. Because the friction force on actuated brake shoe 280 causes it to rotate about pin 283 in the counterclockwise direction it pulls brake shoe 280 into engagement with brake drum 282 and substantially prevents the planet carrier 265 from rotating in the clockwise direction.

When clockwise power is applied to the power source 20, which is connected to the input shaft 261 that is coupled to the sun gear 262, the sun gear 262 rotates in the clockwise direction. The sun gear 262 engages the planet gears 263, causing them to rotate in the counterclockwise direction. The planet gears 263 are further engaged with the fixed ring gear 267, which causes the planet gears 263 to crawl along the ring gear's diameter orbiting the sun gear 262 in the clockwise direction. The planet gears 263 are further engaged with the planet carrier 265 through the planet pins 264 in the carrier slots 276, causing the planet gear pins 264 to move to the full clockwise position in the carrier slots 276. The motion of the planet pins 264 moving to the full clockwise position in the carrier slots 276 acts on the brake actuator mechanism 270, which is caused to rotate in the clockwise direction by pin 288, moving the spring loading/unloading block 285 closer to brake shoe actuating block 287 and further from brake shoe actuating block 286. This action causes brake shoe 281 to be actuated and pushed into brake drum 282 and brake shoe 280 to be pulled from contact with brake drum 282. Because the brake shoes 280 and 281 are attached to the planet carrier 265, which will rotate in the clockwise direction when there is a clockwise input to the input shaft 261, the brake shoes 280 and 281 will rotate clockwise inside the break drum 282. Because the friction force on actuated brake shoe 281 causes it to rotate about pin 284 in the counterclockwise direction it releases brake shoe 281 and it allows the planet carrier to rotate in the desired clockwise direction.

If there is a back-driving force put on the gear set into the planet carrier 265 attempting to move it in the counterclockwise direction, the planet pins 264 move to the full clockwise position in the carrier slots 276. The motion of the planet pins 264 moving to the full clockwise position in the carrier slots 276 acts on the brake actuator mechanism 270, which is caused to rotate in the clockwise direction by pin 288, moving the spring loading/unloading block 285 closer to brake shoe actuating block 287 and further from brake actuating block 286. This action causes brake shoe 281 to be actuated and pushed into brake drum 282 and brake shoe 280 to be pulled from contact with brake drum 282. Because the brake shoes 280 and 281 are attached to the planet carrier 265, which is being back driven in the counterclockwise direction, the brake shoes 280 and 281 will attempt to rotate counterclockwise inside the break drum 282. Because the friction force on actuated brake shoe 281 causes it to rotate about pin 284 in the clockwise direction, it pulls brake shoe 281 into engagement with brake drum 282 and substantially prevents the planet carrier 265 from rotating in the counterclockwise direction.

It will be understood by those of ordinary skill in the art that either or both of the brake shoes may be used thus the gear set is prevented from being back driven in either or both the clockwise or counterclockwise direction.

The invention has been described with respect to certain embodiments that are not intended to be limiting. The scope of the invention is defined by the appended claims and reasonable equivalents of the same.

What is claimed is:

1. An apparatus for locking a gear set, wherein the apparatus is configured to be forward-driven at an input in either of a first direction and a second direction and for substantially preventing an output from being back-driven in either of the first direction and the second direction, the apparatus comprising:
   one or more gears of the gear set engaged with the input and configured for forward-driven motion by the input in the first direction and the second direction;
   a carrier coupled to the output and to the one or more gears, wherein the carrier includes one or more carrier slots, wherein each of the one or more carrier slots is elongated and has a first end and a second end;
   one or more differentiating connectors coupled to respective ones of the gears, wherein each of the differentiating connectors is retained in a respective one of the carrier slots and arranged to move between the first end and the second end of the carrier slots;
   one or more unidirectional engage/disengage components configured to permit forward-driven movement of the one or more gears and to prevent back-driven movement of the one or more gears; and
   wherein each differentiating connector is arranged to permit forward-driven movement in the first direction and to prevent back-driven movement of its respective gear when at or near the first end of its slot and to permit forward-driven movement in the second direction and to prevent back-driven movement of its respective gear when at or near the second end of its slot.

2. The apparatus of claim 1 wherein the carrier and the output are the same.

3. The apparatus of claim 1 wherein the output is a load to be moved in a vertical direction.

4. The apparatus of claim 1 wherein the gear set is part of a planet gear set that includes a sun gear coupled to the input and arranged to cause the one or more gears to rotate in a direction opposite of the direction of rotation of the sun gear; wherein the one or more differentiating connectors are carrier pins engaged in a respective one of the plurality of carrier slots and with a respective one of the one or more gears of the gear set.

5. The apparatus of claim 4, wherein the unidirectional engage/disengage component includes:
   one or more first gear wedges and one or more second gear wedges coupled to the carrier, wherein there is one first gear wedge and one second gear wedge adjacent to each of the one or more gears;
   wherein each of the first gear wedges is disposed to engage substantially with the gears to permit gear rotation in the first direction and to prevent gear rotation in the second direction; and
   wherein each of the second gear wedges is disposed to engage substantially with the gears to permit gear rotation in the second direction and to prevent gear rotation in the first direction.

6. The apparatus of claim 5, wherein at least one of the first gear wedges and at least one of the second gear wedges is a friction coupling.

7. The apparatus of claim 5, wherein at least one of the first gear wedges and at least one of the second gear wedges is a conical friction coupling.

8. The apparatus of claim 5, wherein at least one of the first gear wedges and at least one of the second gear wedges is a mechanical coupling.

9. The apparatus of claim 1, wherein the differentiating connectors are carrier pins and the unidirectional engage/disengage component includes:
   an upper ratchet mechanism including one or more upper ratchet followers that are predisposed to rotate about the carrier pins;
   a lower ratchet mechanism including one or more lower ratchet followers that are predisposed to rotate about the carrier pins;
   a first spring-loaded pawl and a second spring-loaded pawl coupled to the upper ratchet mechanism and the lower ratchet mechanism, respectively;
   a first ratchet cam and a second ratchet cam coupled to the first spring-loaded pawl and the second spring-loaded pawl, respectively; and
   wherein the upper ratchet mechanism is predisposed to allow rotation in the counterclockwise direction but substantially preventing rotation in the clockwise direction when it is engaged, and the lower ratchet mechanism is predisposed to allow rotation in the clockwise direction and substantially prevent rotation in the counterclockwise direction when it is engaged.

10. The apparatus of claim 1, wherein the differentiating connectors are carrier pins and the unidirectional engage/disengage component includes:
   a brake actuator engaged with the carrier pins through a rotating linkage
   a first brake actuation block and a second brake actuation block coupled to the carrier;
   a spring loading/unloading block proximal to and distal to the first brake actuation block and the second brake actuation block;
   a first brake shoe predisposed to allow rotation of the carrier in a counterclockwise direction but substantially predisposed to prevent rotation of the carrier in a clockwise direction when actuated; and
   a second brake shoe predisposed to allow rotation of the carrier in the clockwise direction but substantially predisposed to prevent rotation of the carrier in the counterclockwise direction when actuated.

* * * * *